Patented July 19, 1949

2,476,832

UNITED STATES PATENT OFFICE 2,476,832

VINYL CHLORIDE RESIN COMPOSITIONS CONTAINING IMIDAZOLIDINES

Robert A. Donia, Houghton, Mich., assignor to The Firestone Tire & Rubber Company, Akron, Ohio, a corporation of Ohio No Drawing. Application June 5, 1947, Serial No. 752,846

10 Claims. (Cl. 260—86.3)

This invention relates to vinyl chloride resin compositions having improved physical and chemical properties, notably higher tensile strength, improved mechanical properties at elevated temperatures, and enhanced resistance to solvents. The invention also relates to a method of producing these compositions.

A number of thermoplastic resins based upon vinyl chloride have appeared in recent years and, being low in cost and having many desirable properties, have come into extensive use. These resins are flexible and, with proper compounding, can be made semi-elastic, thus occupying a unique position intermediate in character between the hard resins and the elastomers. However, these resins are somewhat low in tensile strength, particularly at elevated temperatures, and are soluble in certain organic solvents. These defects exclude the vinyl chloride resins from many applications for which they would otherwise be very suitable.

It has heretofore been sought to overcome these defects of the vinyl chloride resins by incorporating therein certain agents designed to act somewhat similarly as vulcanizing agents do in rubber and the like, i. e., to convert the resin to an insoluble and infusible condition upon heat curing. None of these curing agents have proven entirely satisfactory, however, notable defects being insufficient improvement in the resin properties; too rapid action, whereby the resin sets up during the preliminary compounding; and a tendency to continued curing action in the final cured articles, which gradually increase in stiffness, ultimately becoming unusable.

Accordingly, it is an object of this invention to provide novel agents for curing vinyl chloride resins to produce therein greatly improved tensile strength and other physical properties, and greatly enhanced resistance to solvent action.

Another object is to provide such agents which will have a "delayed" action, i. e., will permit the working and compounding of vinyl chloride resins at moderately elevated temperatures and reasonably long times, but which will effect a cure of the resins in final fabricated form.

A further object is to provide such agents which will be free from a tendency to further modify the resins after the heat curing cycle is completed.

A still further object is to provide novel cured compositions of vinyl chloride resins which will be characterized by enhanced tensile strength and solvent resistance, which properties will be retained at extremes of high and low temperatures.

SYNOPSIS OF THE INVENTION

The above and other objects are secured, in accordance with this invention, by the incorporation in a vinyl chloride resin composition, of from about 0.5% to about 10% based on the weight of vinyl chloride resin, of an imidazolidine having the formula:

FORMULA A

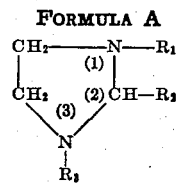

wherein $R_1$ represents an aliphatic, cycloaliphatic or an araliphatic group containing from 1 to 22 carbon atoms; this group may preferably be simple hydrocarbon, or may contain ester, ether, nitrile, hydroxy, or other stable inert structures.

$R_2$ represents a hydrogen atom or an aliphatic, cycloaliphatic, araliphatic or aromatic group containing from 1 to 22 carbon atoms; this group may be simple hydrocarbon or may contain ester, ether, nitrile, hydroxy, or other stable inert structures, and $R_3$ represents any of the groups which $R_1$ may represent.

The resultant compositions, when cured at elevated temperatures on the order of 100°–200° C., for periods of time on the order of 15–200 minutes, have greatly enhanced tensile strength, which is retained both at high and low temperatures; increased resistance to solvents; increased elastic modulus, which increase does not proceed to an undesirable extent; and unimpaired, and in most cases enhanced, flex resistance. The imidazolidines have a delayed curing action, i. e., they may be compounded and worked with the resin for considerable periods at moderately elevated temperatures without causing the resin to "set up."

THE VINYL CHLORIDE RESIN

Referring first to the vinyl chloride resins which may be cured in accordance with this invention, these may be any polymers of unmixed vinyl chloride, such as "Vinylite QYNA" or "Geon 101" (trade-marks respectively of the Carbide & Carbon Chemicals Corporation and of the B. F. Goodrich Company). Instead of, or in admixture with, the simple vinyl chloride polymers, there may be employed resinous copolymers of vinyl chloride with minor proportions (say up to 30% based on the total weight of copolymer) of one or more other non-cross-linking (i. e., mono-unsaturated, or conjugated, or cross-conjugated) compounds copolymerizable therewith such as vinyl esters on the order of vinyl bromide, fluoride, formate, acetate, chloroacetate, propionate and higher fatty carboxylates, benzoate and other aryl carboxylates; vinyl ethyl and other vinyl alkyl sulfones, and the like; vinyl ethers and thio-ethers such as vinyl ethyl ether, vinyl ethyl sulfide, vinyl β-chloroethyl ether, vinyl higher alkyl ethers, vinyl phenyl ether and the like; vinyl ketones such as vinyl ethyl and higher alkyl ketones, vinyl phenyl ketone and the like; vinyl carbazoles; vinyl aromatics such as styrene, α-methyl styrene, nuclearly chlorinated styrenes, etc.; acrylic and substituted acrylic derivatives such as methyl acrylate, ethyl acrylate, methyl methacrylate, ethyl chloroacrylate, acrylonitrile, methacrylonitrile, etc.; vinylidene compounds such as vinylidene chloride, vinylidene bromide, vinylidene fluoride, ethyl isopropenyl ketone and the like; cyclic unsaturated compounds such as indene, coumarone, 2-methylene-1,3-dioxolane; olefines such as ethylene, isobutylene and the like; and conjugated unsaturated compounds such as butadiene, isoprene, 2,3-dimethyl-butadiene-1,3, chloroprene and the like. For a more complete catalog of compounds copolymerizable with vinyl chloride, reference should be made to Krczil, "Kurzes Handbuch der Polymerisations—Technik—vol. II—Mehrstoffpolymerisation," Edwards Bros. Inc., 1945, pp. 735–737, the items listed under "Vinyl chlorid."

THE IMIDAZOLIDINES

The imidazolidine curing agents employed in this invention are represented in the Formula A hereinabove. Examples of the substituents which may be represented by the symbols $R_1$ and $R_3$ in the formula are aliphatic hydrocarbon radicals such as methyl, ethyl, propyl, isopropyl, butyl, n-amyl, allyl, cyclohexyl, 2-ethyl-hexyl, dodecyl, octadecyl, abietinyl, and other aliphatic and cycloaliphatic aliphatic hydrocarbon radicals containing up to 22 carbon atoms. In place of the simple hydrocarbon radicals, there may be employed aliphatic radicals containing structures which are stable and inert under the conditions of curing, such as carboxylic ester, ketone, and ether linkages, with the qualification that the total number of carbon atoms in each of the radicals $R_1$ and $R_3$ shall not exceed 22. Examples of such substituents are oxyethyl, dodecyl-oxyethyl, acetoxyethyl, and the like. It is to be understood that $R_1$ and $R_3$ need not be identical in any given compound, e. g., $R_1$ may be ethyl, while $R_3$ is isopropyl, and so on. The symbol $R_2$ may designate any of the radicals which $R_1$ and $R_3$ may designate, and may also designate hydrogen or an aromatic substituent containing up to 22 carbon atoms, which substituent may be simple hydrocarbon or may contain inert groupings such as carboxylic ester, ether and keto structures. The aromatic substituents in the number two position are preferred in some cases, in that they exert a somewhat more energetic curing action. Examples of suitable aromatic substituents coming under the ambit of the notation $R_2$ are phenyl; o-, p-, or m-cresyl; any of the several xylyl groups; p-phenylphenyl; 2-methoxyphenyl; 2,3-dimethoxyphenyl; and the like. Examples of specific compounds coming under the general Formula A and suitable for use in this invention include inter alia, the following imidazolidines, the position numbering being as indicated on Formula A above. In the several tables to follow, it will be understood that the word "imidazolidine" should follow the substituent notations tabulated; and that the positions in the imidazolidine ring are numbered so that, in Formula A above, $R_1$, $R_2$ and $R_3$ occupy respectively the 1-, 2- and 3-positions.

TABLE I 1,3-diethyl-
1,3-diethyl-2-propyl-
1,3-diethyl-2-phenyl-
1-ethyl-2-methyl-
1,3-diisopropyl-
1,3-diisopropyl-2-propyl-
1,3-diisopropyl-2-phenyl-
1-ethyl-2 phenyl-3 methyl-
1,3-diallyl-
1,3-diallyl-2-propyl-
1,3-diallyl-2-phenyl-
1,3-dibutyl-
1,3-dibutyl-2-propyl-
1,3-dibutyl-2-phenyl-
1,3-di-sec.-amyl-
1,3-di-sec.-amyl-2 propyl-
1,3-di-sec.-amyl-2 phenyl-
1,3-dicyclohexyl-
1,3-dicyclohexyl-2 propyl-
1,3-dicyclohexyl-2-phenyl-
1,3-dicyclohexyl-2-(2' 3' dimethoxy phenyl)-
1,3-di(2-ethylhexyl)-
1,3-di(2-ethylhexyl)-2-propyl-
1,3-di(2-ethylhexyl)-2-phenyl-

THE PROPORTION OF IMIDAZOLIDINE AND DURATION AND TEMPERATURE OF CURING

The extent of cure of the compositions of this invention as reflected by increasing modulus and, up to a certain point, increasing ultimate tensile strength, is an increasing function of each of the variables: (1) amount of imidazolidine curing agents incorporated into the resin composition, (2) temperature of curing and other handling at elevated temperatures, and (3) duration of the curing and other handling at elevated temperatures. In general, a substantial enhancement of modulus, tensile strength, resistance to solvents, and (in some cases of relatively low degrees of cure) elongation at break, may be secured by the incorporation of as little as 0.5% of the curing agent, based on the weight of vinyl chloride resin; curing temperatures as low as 90° C.; and curing times as short as 15 minutes. These values may be increased to as much as 10%, 300° C. and 200 minutes respectively, without producing an over-cure, i. e., undue stiffening or embrittlement of the resins such as to render them unfit for conventional applications. The properties desired in the final products will largely govern the degree of cure to which a given composition is subjected. For instance, if it is desired to produce some article, such as a flexible tubing, having a moderate resistance to solvents but without outstanding increase in mechanical properties, a relatively low degree of cure will be applied. On the other hand, if a rather stiff and tough article, such as a composition flooring, is desired, a higher degree of cure will be resorted to. In general, the preferred compositions will contain from about 2% to about 6% of the imidazolidine curing agents, and will be cured at temperatures from about 115° C. to about 200° C. for from about 30 minutes to about 120 minutes. The exact formulation and treatment of a composition for any given end use will be determined by the general considerations above set out, and by selection of finished compositions from amongst those set forth hereinbelow in Tables II–IV having the combinations of properties most nearly approximating the ideal properties demanded by the contemplated end use.

COMPOUNDING AND FABRICATION

The imidazolidine curing agents of this invention may be incorporated with the vinyl chloride resin compositions in any of the stages of compounding, and by means of any suitable apparatus, such as a roll mill, Banbury mixer, or the like, at the usual compounding temperatures employed with these resins. The delayed action of the imidazolidine curing agents is of particular advantage in this connection, since the imidazolidines may be thoroughly worked with the resin at the usual compounding temperatures of 140° C. to 160° C. for considerable periods without effecting a premature cure. This feature also permits of hot fabrication, e. g., calendering, extruding, etc. prior to cure. The imidazolidine should, of course, be withheld as long as possible before incorporating into the heated mass. It will also be understood that the imidazolidines may be incorporated into solvent, plasticizer, aqueous and other solutions and dispersions of vinyl resin compositions not involving hot mixing. Articles fabricated by spreading, etc. from such cold-compounded fluid compositions will be subjected to a heat cure at an appropriate stage of manufacture.

It is to be understood that the curing agents of this invention may be used in vinyl chloride resin formulations containing any of the usual compounding ingredients such as plasticizers, stabilizers, pigments, dyes, etc. Likewise, they may be incorporated into blends of vinyl chloride resins with other high polymeric materials, such as blends of vinyl chloride resins with elastomeric copolymers of butadiene and acrylonitrile, phenolic resins, alkyd resins, and the like.

THE CURED PRODUCTS

Compared with corresponding vinyl chloride resin compositions containing no curing agents, the cured compositions of this invention are characterized by enhanced tensile strength, particularly at higher temperatures. At room temperature, with optimum cure conditions, the tensile strength of cured specimens will usually be 115%–140% of the value for uncured specimens; at more elevated temperatures, the difference is more striking, and the tensile strength of cured samples may be as much as 300%–400% of the value for uncured samples. The modulus of elasticity is increased to about 130–140% at room temperature, and to about 400–500% at 100° C., of the values for uncured samples. The elongation at break, both for high and low temperatures, seems to be slightly increased at low degrees of cure and somewhat decreased at high degrees of cure. Despite the somewhat enhanced mechanical properties at ordinary and elevated temperatures, the compositions of this invention are not noticeably more brittle than conventional compositions at extremely low temperatures.

These enhanced mechanical properties, particularly at elevated temperatures, open up new fields of application for vinyl chloride resins, and greatly increase the utility thereof in established fields. Another property of the cured resins is their insolubility in organic solvents. Even at low degrees to cure, the cured resins merely swell in solvents, and this swelling is reduced with progressively increased degrees of cure. The cured materials are characterized by a "drier" surface, i. e., less tendency toward sticking and blocking. It will thus be seen that the compositions of this invention will be admirably adapted for many purposes, for instance in conduits for liquids, and particularly for hot and/or solvent liquids; in web materials such as calendered sheetings, coated fabrics, films, etc., where the enhanced mechanical strength, flex resistance and "dryness" are of great advantage; electrical insulation, where the retention of physical properties at high temperature is of extreme importance; control lever boots and bellows; adhesive compositions, particularly those which are to be exposed to solvents and/or heat in their final applications; vibration pads, elastic mountings, flexible shaft couplings, etc.; phonograph records; shoe soling material; composition floorings; adhesives and many other applications.

With the foregoing general discussion in mind, there are given herewith detailed examples of the practice of this invention. All parts given are by weight.

EXAMPLE I

FORMULATION

|   |   | Parts |
|---|---|---|
| A | Vinyl chloride based resin ("Vinylite VYNW," a copolymer of 85% vinyl chloride and 15% vinyl acetate, sold by the Carbide and Carbon Chemicals Corporation) | 100 |
|   | Calcium stearate | 5 |
|   | Magnesium carbonate | 2 |
|   | Dioctyl phthalate | 70 |
|   | Channel black | 5 |
| Imidazolidine curing agent (as set forth in Table I) | | 5 |

COMPOUNDING AND CURING

A series of compositions was made up in accordance with the foregoing schedule, using each of the imidazolidines listed in Table I. In each case, the ingredients listed at "A" were compounded on a roll mill at 140° C., after which the selected imidazolidine curing agent was added and worked into the mass for an additional 7–10 minutes at 140° C. Specimens of the compound, .075" x 5" x 6", were then cured in a press at 157° C. for 15, 30, 60 and 120 minutes. The elongation at break, modulus of elasticity at 200% elongation, and ultimate tensile strength of each cured specimen were determined. Likewise, a swelling test was conducted on each specimen by immersing strips .075" x .075" x 100 mm. in cyclohexanone for 24 hours, the swelling being recorded as the length of the strips after immersion. The imidazolidines used in, and curing times and temperatures of, the various specimens prepared, are set forth in Table II, together with the test results obtained. The tensile strengths and moduli of elasticity are given in pounds per square inch, denoted by the abbreviation "(#/in.²)."

TABLE II

| Imidazolidine Used | Percent Elongation at Break with curing times of— | | | Modulus at 200% Elongation (#/in.²) with curing times of— | | | Tensile Strength (#/in.²) with curing times of— | | | Swelling (mm.) with curing times of— | | |
|---|---|---|---|---|---|---|---|---|---|---|---|---|
| | 30 min. | 60 min. | 120 min. | 30 min. | 60 min. | 120 min. | 30 min. | 60 min. | 120 min. | 30 min. | 60 min. | 120 min. |
| 1,3-diethyl- | | 270 | 220 | | 1,500 | 1,700 | | 1,975 | 1,900 | | 181 | 162 |
| 1,3-diethyl-2-propyl- | [1]260 | 250 | 220 | [1]1,575 | 1,775 | 1,800 | [1]2,100 | 2,075 | 1,850 | [1]231 | 161 | 154 |
| 1,3-diethyl-2-phenyl- | 290 | 270 | 170 | 1,600 | 1,800 | | 2,150 | 2,200 | 1,850 | 180 | 158 | 147 |
| 1,3-diisopropyl- | 350 | 300 | 180 | 1,500 | 1,550 | 1,250 | 2,325 | 2,225 | 1,150 | 215 | 196 | 157 |
| 1,3-diisopropyl-2-propyl- | 290 | 300 | 240 | 1,525 | 1,600 | 1,825 | 2,150 | 2,250 | 2,000 | 187 | 171 | 157 |
| 1,3-diisopropyl-2-phenyl- | 260 | 200 | 150 | 1,700 | 1,900 | | 2,050 | 1,900 | 1,575 | 169 | 152 | 139 |
| 1,3-diallyl- | 330 | 280 | 200 | 1,475 | 1,750 | 1,900 | 2,250 | 2,325 | 1,900 | 222 | 189 | 153 |
| 1,3-diallyl-2-propyl- | 300 | 270 | 190 | 1,750 | 1,800 | 1,950 | 2,450 | 2,400 | 1,950 | 194 | 165 | 149 |
| 1,3-diallyl-2-phenyl- | 330 | 310 | 215 | 1,350 | 1,550 | 1,875 | 2,225 | 2,225 | 1,925 | 209 | 185 | 151 |
| 1,3-dibutyl- | 290 | 250 | 190 | 1,650 | 1,850 | 1,950 | 2,250 | 2,150 | 1,975 | 172 | 162 | 140 |
| 1,3-dibutyl-2-propyl- | 330 | 280 | 90 | 1,575 | 1,600 | | 2,300 | 2,175 | 875 | 213 | 168 | 142 |
| 1,3-dibutyl-2-phenyl- | 330 | 280 | | 1,625 | 1,875 | | 2,400 | 2,425 | | 197 | 161 | |
| 1,3-di-sec-amyl- | 280 | 120 | 80 | 1,600 | | | 2,125 | 1,025 | 475 | 179 | 162 | 138 |
| 1,3-di-sec-amyl-2-propyl- | 330 | 270 | | 1,750 | 1,900 | | 2,450 | 2,400 | | 197 | 163 | |
| 1,3-di-sec-amyl-2-phenyl- | 300 | 240 | 90 | 1,625 | 1,750 | | 2,225 | 2,050 | 350 | 179 | 162 | 138 |
| 1,3-di-cyclohexyl-2-phenyl- | [1]300 | 190 | 40 | [1]1,525 | 2,050 | | [1]2,075 | 2,000 | 650 | [1]210 | 161 | 121 |
| 1,3-di-cyclohexyl-2-propyl- | 270 | 220 | 170 | 1,850 | 1,250 | | 2,125 | 1,250 | 1,300 | 166 | 153 | 145 |
| 1,3-di-cyclohexyl-2-phenyl- | [1]210 | 90 | 70 | [1]1,825 | | | [1]1,800 | 950 | 975 | [1]169 | 137 | 129 |
| 1,3-di-cyclohexyl-2-phenyl- | 240 | 100 | 70 | 1,825 | | | 2,125 | 1,175 | 625 | 152 | 132 | 124 |
| 1,3-di-cyclohexyl-2,3-di-methoxy-phenyl- | [1]270 | 240 | 150 | [1]1,425 | 1,700 | | [1]1,900 | 1,825 | 1,600 | [1]198 | 158 | 147 |
| 1,3-di-(2-ethylhexyl)- | 340 | 290 | 210 | 1,375 | 1,550 | 1,800 | 2,250 | 2,250 | 1,850 | 219 | 179 | 148 |
| 1,3-di-(2-ethylhexyl)-2-propyl- | 310 | 250 | 170 | 1,525 | 2,050 | | 2,250 | 2,375 | 1,750 | 192 | 154 | 145 |
| 1,3-di-(2-ethylhexyl)-2-phenyl- | 350 | 340 | 250 | 1,575 | 1,750 | 1,875 | 2,450 | 2,500 | 2,175 | 237 | 186 | 159 |
| None | 360 | 330 | 340 | 1,500 | 1,525 | 1,525 | 2,300 | 2,325 | 2,275 | all dissolved | | |

[1] Specimen cured for 15 minutes rather than 30 minutes.

EXAMPLE II

|  | Parts |
|---|---|
| A { Vinyl chloride resin ("Vinylite VYNW") | 100 |
| Dioctyl phthalate | 70 |
| Magnesium oxide | 2 |
| Channel black | 5 |
| Calcium stearate | 5 |
| Imidazolidine (per Table III) | 5 |

A series of formulations was made up in accordance with the foregoing schedule, using each of the imidazolidines listed in Table III in turn.

In the case of each formulation, the ingredients listed at "A" were compounded on a roll mill at 140° C., and the selected imidazolidine then worked in by continued milling at 140° C. for 10 minutes additional. The compound was then press cured for various periods of time at various temperatures as indicated in Table III. On each cured sample were determined the elongation at break, modulus of elasticity at 200% elongation, and tensile strength, both at 20° C. and at 100° C.; the flexural endurance, as determined by a machine which repeatedly elongated a sample 0.5" x .075" x 2.0" in a lengthwise direction while simultaneously applying an axial twist of 90°, the elongation being adjusted to 50%, 75% or 100% as selected for the test, and the cycle being repeated 20 times per minute, the number of hours to failure being taken as the flexural endurance; and the flexural modulus at −60° C. Likewise the plasticities of the cured materials were determined by a test in which a disk of the cured material under test .75" in diameter by .075" thick was pressed between heated platens under a total load of 2500 pounds for 30 seconds. The area of the resultant plaques immediately after removal from the platens, together with the temperature of the platens, is set forth in Table III under the heading "Plasticity."

TABLE III

| Imidazolidine Used | Cure | | Properties at 72° F. | | | Properties at 212° F. | | | Plasticity | | Flex Test | | Flexural Modulus at −60° C. |
|---|---|---|---|---|---|---|---|---|---|---|---|---|---|
| | Min. | ° F. | Elongation, Per Cent | Modulus at 200% Elongation | Tensile Strength, #/in.² | Elongation, Per Cent | Modulus at 200% Elongation, #/in.² | Tensile Strength, #/in.² | ° C. | Mm.² | Per Cent Elongation | Hr. | |
| 1,3-dicyclohexyl- | 120 | 280 | 250 | 2,050 | 2,350 | 270 | 640 | 730 | 190 | 2,127 | 100 | 35 | 561,200 |
| 1,3-dicyclohexyl-2-phenyl- | 120 | 280 | 250 | 2,125 | 2,425 | 220 | 600 | 600 | 190 | 1,312 | 100 | 4 | 527,000 |
| 1,3-diisopropyl-2-phenyl- | 120 | 280 | 240 | 2,000 | 2,400 | 240 | 530 | 640 | 190 | 1,390 | 100 | 41 | 616,750 |
| 1,3-diisopropyl- | 160 | 300 | 280 | 1,750 | 2,250 | 220 | 170 | 220 | 175 | 3,421 | 100 | 23 | 373,685 |
| 1,3-diamyl-2-propyl- | 160 | 300 | 230 | 1,975 | 2,200 | 140 | 330 | 360 | 190 | 1,312 | 50 | 96 | 426,828 |
| 1,3-(2 ethyl hexyl)-2-phenyl- | 160 | 300 | 290 | 1,750 | 2,450 | 220 | 280 | 310 | 175 | 1,658 | 50 | 360 | 377,833 |
| Blank | 80 | 300 | 320 | 1,500 | 2,200 | 340 | 175 | 220 | 160 | 3,829 | 100 | 10 | 457,758 |
| Do | 5 | 300 | 320 | 1,550 | 2,100 | 290 | 170 | 190 | 160 | 4,150 | 100 | 6 | 542,250 |

EXAMPLE III

|  | Parts |
|---|---|
| Vinyl chloride resin | 100 |
| Dioctyl phthalate | 70 |
| Magnesium oxide | 2 |
| Channel black | 5 |
| Calcium stearate | 5 |
| 1,3-dibutyl-2-phenyl-imidazolidine (per Table IV) | 0.5, 1.5 or 3.0 |

A series of compounds was made up in accordance with the above schedule, using the imidazolidine in the various proportions listed. The compounding was effected on a roll mill as described in Example I. Samples of the several compounds were cured at 138° C. for periods of 60, 120 and 180 minutes. Properties of the resultant vulcanizates are set forth herewith in Table IV.

resistant, strong, non-tacky and characterized by freedom from tendencies to mutual adhesion.

TABLE IV

| Parts Imidazolidine per 100 parts resin | Cure at 138° C., min. | Properties at 72° F. | | | Properties at 212° F. | | | Swelling Test, mm. (as in Example I) |
|---|---|---|---|---|---|---|---|---|
| | | Elongation, Per Cent | Modulus at 200% Elongation, #/in.² | Tensile Strength, #/in.² | Elongation, Per Cent | Modulus at 200% Elongation, #/in.² | Tensile Strength, #/in.² | |
| 0.5 | 60 | 270 | 1,525 | 2,000 | 235 | 50 | 50 | 200 |
| | 120 | 280 | 1,625 | 2,075 | 250 | 75 | 75 | 224 |
| | 180 | 280 | 1,625 | 2,125 | 270 | 100 | 125 | 228 |
| 1.5 | 60 | 280 | 1,600 | 2,150 | 265 | 100 | 125 | 240 |
| | 120 | 280 | 1,700 | 2,175 | 300 | 125 | 175 | 212 |
| | 180 | 280 | 1,700 | 2,175 | 340 | 150 | 275 | 220 |
| 3.0 | 60 | 250 | 1,750 | 2,025 | 275 | 200 | 250 | 184 |
| | 120 | 230 | 1,800 | 2,050 | 260 | 225 | 275 | 148 |
| | 180 | 230 | 1,800 | 2,075 | 250 | 225 | 325 | 132 |

EXAMPLE IV

| | Parts |
|---|---|
| "Geon 101" (straight polyvinyl chloride manufactured by the B. F. Goodrich Co.) | 100 |
| Dioctyl phthalate | 70 |
| Magnesium oxide | 2 |
| Channel black | 5 |
| Calcium stearate | 2 |
| N,N'-dicyclohexyl-imidazolidine | 5 |

The above ingredients were compounded together in the order named on a roll mill at 140° C. Samples of the resultant compound were press-cured at 280° F. for periods of 60, 120 and 180 minutes. Following are the properties of the cured specimens.

TABLE V

| Percent Elongation when cured for— | | | Tensile Strength (#/in.²) when cured for— | | |
|---|---|---|---|---|---|
| 60 min. | 120 min. | 180 min. | 60 min. | 120 min. | 180 min. |
| 120 | 110 | 75 | 1,300 | 1,450 | 1,375 |

EXAMPLE V

CALENDERED FABRIC

| | Parts |
|---|---|
| A { Vinyl chloride resin (Vinylite VYNW) | 100 |
| Dioctyl phthalate | 70 |
| Calcium stearate | 5 |
| Magnesium oxide | 2 |
| Titanium dioxide ("Titanox" manufactured by Titanium Pigment Corp.) | 3 |
| Paraffin wax | 2 |
| Red dyed titanium dioxide (Akron Chemical Co., "Red 503") | 2 |
| 1,3-diisopropyl-2-phenyl-imidazolidine | 4 |

The ingredients listed at "A" were compounded on a roll mill at 140° C., and the 1,3-diisopropyl-2-phenyl-imidazolidine added last and worked in as rapidly as convenient. The compound was then transferred to a calender, and calendered onto a 3 oz. per sq. yard cotton sheeting fabric, the calendering temperature being 130° C., and the coating being deposited at the rate of 7.5 oz. per sq. yard. The resultant fabric was passed on a festoon conveyor through an oven maintained at 160° C., the dwell in the oven being 20 minutes. The resultant calendered fabric was flex

EXAMPLE VI

DIP COATING

| | Parts |
|---|---|
| Vinyl chloride resin ("Geon 202," a copolymer of 90% vinyl chloride, 10% vinylidene chloride, product of the B. F. Goodrich Company) | 68 |
| Dibutoxy ethyl phthalate | 31.5 |
| 1,3-dicyclohexyl-2-phenyl-imidazolidine | 4.0 |
| Methyl ethyl ketone | 350 |

The foregoing ingredients were made up into a cement, and a rayon voile fabric coated therewith by dipping, and dried. The coating deposit was 1.5 ounces per square yard. The fabric was hung in an oven at 160° C. for 40 minutes, resulting in a coating which was strong, flex resistant and tack-free even at elevated temperatures.

EXAMPLE VII

| | Parts |
|---|---|
| Vinyl chloride resin ("Geon 202," a copolymer of 90% vinyl chloride, 10% vinylidene chloride, manufactured by the B. F. Goodrich Company) | 100 |
| Dibutyl sebacate | 30 |
| Butadiene-acrylonitrile copolymer ("Butaprene NSP," a copolymer of 55% butadiene, 45% acrylonitrile manufactured by The Firestone Tire & Rubber Company) | 13 |
| Calcium stearate | 3 |
| 1,3-diisopropyl-2-phenyl-imidazolidine | 5 |

All of the foregoing ingredients except the imidazolidine were compounded on a roll mill at 140° C., after which the imidazolidine was added and worked into the mass at the same temperature. Sheets of the compound were press-cured at 150° C. for 30, 90 and 150 minutes, yielding products suitable as an artificial leather. Properties of the products are set forth in Table VI, the tensile strength being given in pounds per square inch, abbreviated as "p. s. i."

TABLE VI

| Curing time, min. | Elongation at break, percent | Tensile strength, p. s. i. |
|---|---|---|
| 30 | 160 | 2,600 |
| 90 | 140 | 2,850 |
| 150 | 120 | 3,175 |

From the foregoing general discussion and detailed specific examples, it will be evident that this invention provides novel curing agents for the vinyl chloride resins, possessing advantages not attained in agents heretofore proposed for this use. The imidazolidine curing agents of this invention permit very extensive working of the vinyl resin in advance of the curing step. The cured products have enhanced mechanical properties and solvent resistance, which properties are particularly striking at elevated temperatures. The cured products are stable and not subject to after-cure.

What is claimed is:

1. A composition comprising a resin selected from the group consisting of polymers of vinyl chloride and copolymers thereof with up to 30% of other unsaturated compounds copolymerizable therewith, together with from about 0.5% to about 10%, based on the weight of resin, of an imidazolidine having the formula:

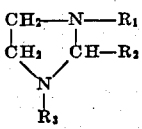

wherein $R_1$ and $R_3$, each independently of the other, represent substituents selected from the group consisting of aliphatic, cycloaliphatic and araliphatic hydrocarbon radicals containing from 1 to 22 carbon atoms, and radicals of the aforesaid types containing ester, ether, nitrile and hydroxy groups, and $R_2$ represents a substituent selected from the group consisting of the hydrogen atom and aliphatic, cycloaliphatic aromatic and araliphatic hydrocarbon radicals containing from 1 to 22 carbon atoms, and radicals of the aforesaid types containing ester, ether, nitrile and hydroxy groups.

2. A composition comprising a resinous copolymer of vinyl chloride with up to 30% of vinyl acetate, together with from about 0.5% to about 10%, based on the weight of resin, of an imidazolidine having the formula:

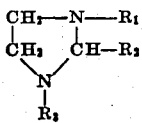

wherein $R_1$ and $R_3$, each independently of the other, represent substituents selected from the group consisting of aliphatic, cycloaliphatic and araliphatic hydrocarbon radicals containing from 1 to 22 carbon atoms, and radicals of the aforesaid types containing ester, ether, nitrile and hydroxyl groups, and $R_2$ represents a substituent selected from the group consisting of the hydrogen atom and aliphatic, cycloaliphatic, aromatic and araliphatic hydrocarbon radicals containing from 1 to 22 carbon atoms, and radicals of the aforesaid types containing ester, ether, nitrile and hydroxy groups.

3. A composition comprising a resinous copolymer of vinyl chloride with up to 30% of vinylidene chloride, together with from about 0.5% to about 10%, based on the weight of resin, of an imidazolidine having the formula:

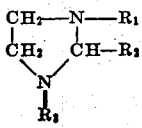

wherein $R_1$ and $R_3$, each independently of the other, represent substituents selected from the group consisting of aliphatic, cycloaliphatic and araliphatic hydrocarbon radicals containing from 1 to 22 carbon atoms, and radicals of the aforesaid types containing ester, ether, nitrile and hydroxy groups, and $R_2$ represents a substituent selected from the group consisting of the hydrogen atom and aliphatic, cycloaliphatic, aromatic and araliphatic hydrocarbon radicals containing from 1 to 22 carbon atoms, and radicals of the aforesaid types containing ester, ether, nitrile and hydroxy groups.

4. A composition of matter comprising a resinous copolymer of vinyl chloride with up to 30% of vinyl acetate, together with from about 0.5% to about 10%, based on the weight of copolymer, of 1,3-dicyclohexyl-2-phenyl-imidazolidine.

5. A composition of matter comprising a resinous copolymer of vinyl chloride with up to 30% of vinyl acetate, together with from about 0.5% to about 10%, based on the weight of copolymer, of 1,3-diallyl-2-phenyl-imidazolidine.

6. A composition of matter comprising a resinous copolymer of vinyl chloride with up to 30% of vinylidene chloride, together with from about 0.5% to about 10%, based on the weight of copolymer, of 1,3-diisopropyl-2-phenyl-imidazolidine.

7. A heat cured composition comprising a resin selected from the group consisting of polymers of vinyl chloride and copolymers thereof with up to 30% of other unsaturated compounds copolymerizable therewith, together with from about 0.5% to about 10%, based on the weight of resin, of an imidazolidine having the formula:

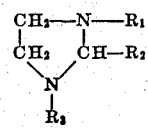

wherein $R_1$ and $R_3$, each independently of the other, represent substituents selected from the group consisting of aliphatic, cycloaliphatic and araliphatic hydrocarbon radicals containing from 1 to 22 carbon atoms, and radicals of the aforesaid types containing ester, ether, nitrile and hydroxy groups, and $R_2$ represents a substituent selected from the group consisting of the hydrogen atom and aliphatic, cycloaliphatic, aromatic and araliphatic hydrocarbon radicals containing from 1 to 22 carbon atoms, and radicals of the aforesaid types containing ester, ether, nitrile and hydroxy groups.

8. A heated cured composition of matter comprising a resinous copolymer of vinyl chloride with up to 30% of vinyl acetate, together with from about 0.5% to about 10%, based on the weight of copolymer, of 1,3-dicyclohexyl-2-phenyl-imidazolidine.

9. A heat cured composition of matter comprising a resinous copolymer of vinyl chloride with up to 30% of vinyl acetate, together with from about 0.5% to about 10%, based on the weight of copolymer, of 1,3-diallyl-2-phenyl-imidazolidine.

10. A heat cured composition of matter comprising a resinous copolymer of vinyl chloride with up to 30% of vinylidene chloride, together with from about 0.5% to about 10%, based on the weight of copolymer of 1,3-diisopropyl-2-phenyl-imidazolidine.

ROBERT A. DONIA.

No references cited.

Certificate of Correction

Patent No. 2,476,832                                          July 19, 1949

ROBERT A. DONIA

It is hereby certified that errors appear in the printed specification of the above numbered patent requiring correction as follows:

Column 6, line 7, for "fo" read *of*; column 12, line 4, for "$R_2$" read $R_3$;

and that the said Letters Patent should be read with these corrections therein that the same may conform to the record of the case in the Patent Office.

Signed and sealed this 31st day of January, A. D. 1950.

[SEAL]

THOMAS F. MURPHY,
*Assistant Commissioner of Patents.*